Figure 1:
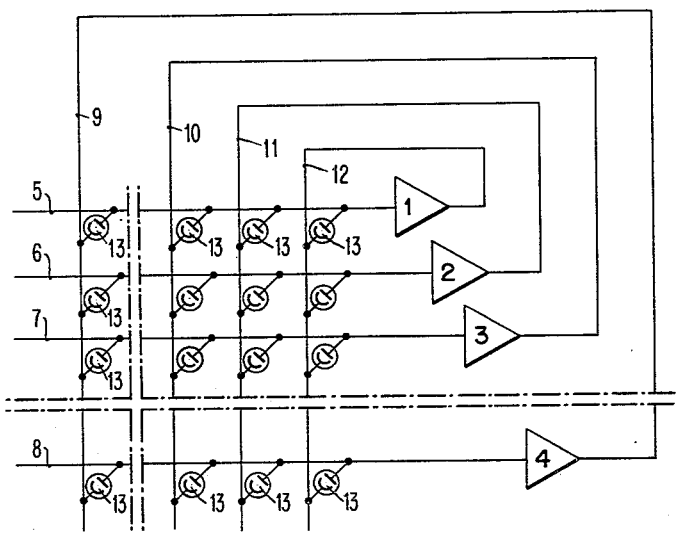

Oct. 6, 1964    R. J. DOMENICO ET AL    3,152,320
SELF REPAIRING ELECTRICAL SIGNAL-TRANSLATING SYSTEM
Filed Feb. 10, 1960    6 Sheets-Sheet 1

FIG. 4a"

*INVENTORS*
ROBERT J. DOMENICO
ROBERT A. HENLE

BY *Everett A. Hartrell*

*ATTORNEY*

Oct. 6, 1964  R. J. DOMENICO ETAL  3,152,320

SELF REPAIRING ELECTRICAL SIGNAL-TRANSLATING SYSTEM

Filed Feb. 10, 1960  6 Sheets-Sheet 3

United States Patent Office 3,152,320
Patented Oct. 6, 1964

3,152,320
SELF REPAIRING ELECTRICAL SIGNAL-
TRANSLATING SYSTEM
Robert J. Domenico, Wappingers Falls, and Robert A.
Henle, Hyde Park, N.Y., assignors to International
Business Machines Corporation, New York, N.Y., a
corporation of New York
Filed Feb. 10, 1960, Ser. No. 7,835
19 Claims. (Cl. 340—147)

The present invention is directed to electrical signal-translating systems and, more particularly, to self-repairing electrical signal-translating systems. While the invention has a variety of applications, it has particular utility in data processing apparatus such as electrical computers. Accordingly, the invention will be described in that environment.

For some applications it is desirable to interconnect one plurality of circuits with another plurality thereof and then, at some subsequent time, to reconnect the circuits in accordance with a completely different plan. This situation is particularly true with reference to the control and arithmetic units of a computer. Heretofore control panels or plugboards have been the key to much of the flexibility in computers.

Special-purpose computers are designed to solve particular military and commercial problems such as bombing and navigation, process control, and special accounting operations. Since their application is much more limited than that of a general-purpose computer, special-purpose computers can be built at a relatively low cost. For some operations, however, there exists the need for a general-purpose computer with the added feature of being able to rearrange or rewire its circuits automatically and almost instantaneously to perform the specialized operations of a special-purpose computer. Control panels cannot perform this function since they are adapted to make a much more limited number of wiring or circuit changes than are required to convert a general-purpose computer to one having special-purpose features.

Computers are complex machines which occasionally are subject to faulty operation because of the malfunctioning of components of circuits. To reduce the Herculean task of finding and correcting such trouble, equipment is needed to detect such faults as they develop, indicate their location, and automatically rearrange circuits so as to isolate the faulty circuit and substitute an operative circuit therefor in order that the operation of the computer may proceed with dispatch. Such self-repairing means is needed in a wide variety of electrical signal-translating systems including those employed in both special-purpose and general-purpose computers.

It is an object of the present invention therefore to provide a new and improved electrical signal-translating system which is particularly useful for increasing the versatility of a general-purpose computer without greatly increasing its cost.

It is another object of the invention to provide a new and improved electrical signal-translating system which permits a general-purpose computer to solve problems heretofore delegated to a special-purpose computer.

It is a further object of the invention to provide a new and improved electrical signal translating system which is capable of quickly and automatically rearranging the circuits of the arithmetic and control units of a computer.

It is also an object of the invention to provide a new and improved electrical signal-translating system which is capable of automatically rearranging a plurality of transistor circuits in order that they may selectively perform different switching and logical functions.

It is a still further object of the invention to provide a new and improved electrical signal-translating system which is capable of self repair.

It is an additional object of the invention to provide a new and improved self-repairing electrical signal-translating system which is capable of detecting faulty operations in the circuits of a computer, automatically removing from its circuitry the malfunctioning component or circuit, and establishing corrective circuits so that the computer may quickly resume operation.

It is yet another object of the present invention to provide a new and improved self-repairing electrical signal-translating system which is capable of detecting faults in the arithmetic and control units of the computer, indicating their location, and automatically rearranging circuits so that the operation of that unit and the computer may continue with a minimum loss of time.

In accordance with a particular form of the invention, an electrical signal-translating system comprises a plurality of signal amplifiers including signal-input means and signal-output means wherein the output signals are a fixed logical function of the input signals, and means normally maintaining those amplifiers in a predetermined signal-translating condition. The signal-translating also includes a first plurality of conductors individually coupled to individual ones of the signal-input means and a second plurality of conductors individually coupled to individual ones of the signal-output means. The system additionally includes a plurality of switching elements which are individually coupled by the aforesaid conductors between individual ones of the signal-input means. The system further includes a radiant-energy projecting means which produce selectable patterns of radiant-energy control effects. The aforesaid switching elements are responsive to the control effects selectively to place predetermined ones of the amplifiers in a different signal-translating condition to modify signal translation between the signal-input and signal-output means, whereby the system performs selected signal-translating operations.

Also in accordance with the invention, a self-repairing electrical signal-translating system for use in data-processing apparatus comprises a plurality of interchangeable signal-translating devices. The system also comprises means responsive to radiant energy and including a plurality of connections for selectively connecting various of the aforesaid devices according to a predetermined plan to form at least one operatively connected signal-translating circuit, one of those devices constituting a spare for use in the event of the failure of the aforesaid one of the operatively connected circuits or the device therein. The self-repairing electrical signal-translating further includes means for sensing the aforesaid failure and deriving a control signal therefrom, and means for controlling the pattern of the aforesaid radiant energy and responsive to that signal for effecting circuit rearrangement in accordance with another predetermined plan to include the aforesaid spare in a replacement circuit for the operatively connected circuit which failed.

The foregoing and other objects, features and advantages of the invention will be apparent from the following more particular description of the preferred embodiments of the invention, as illustrated in the accompanying drawings.

Figure 2A:
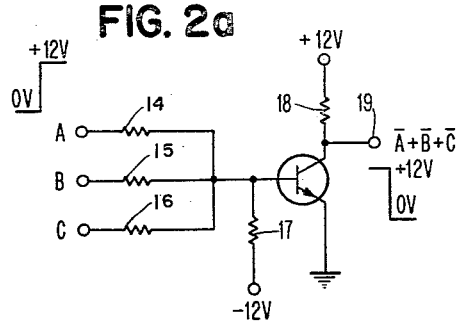
Figure 2B:
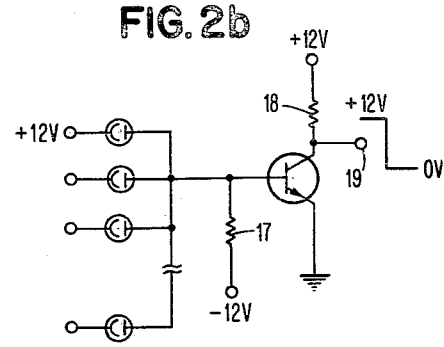
Figure 2B:
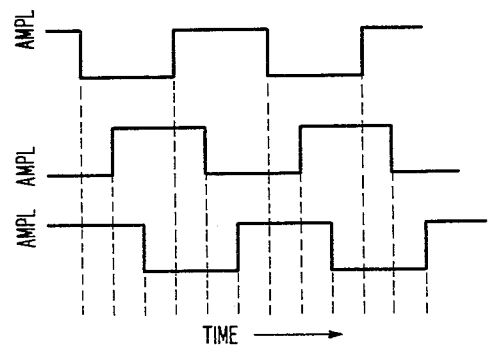
Figure 3:
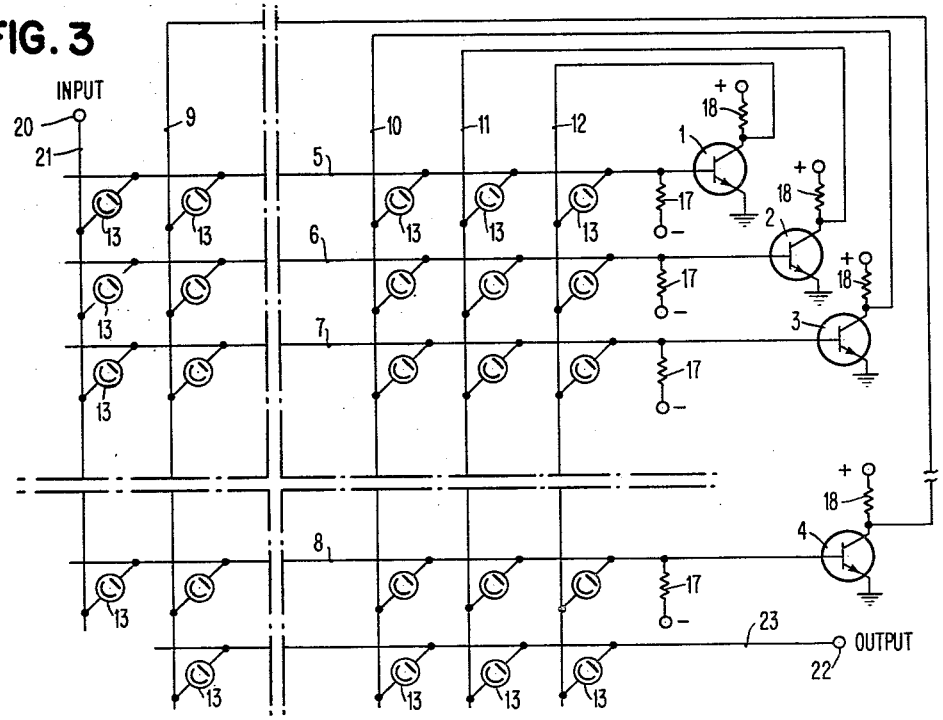
Figure 6:
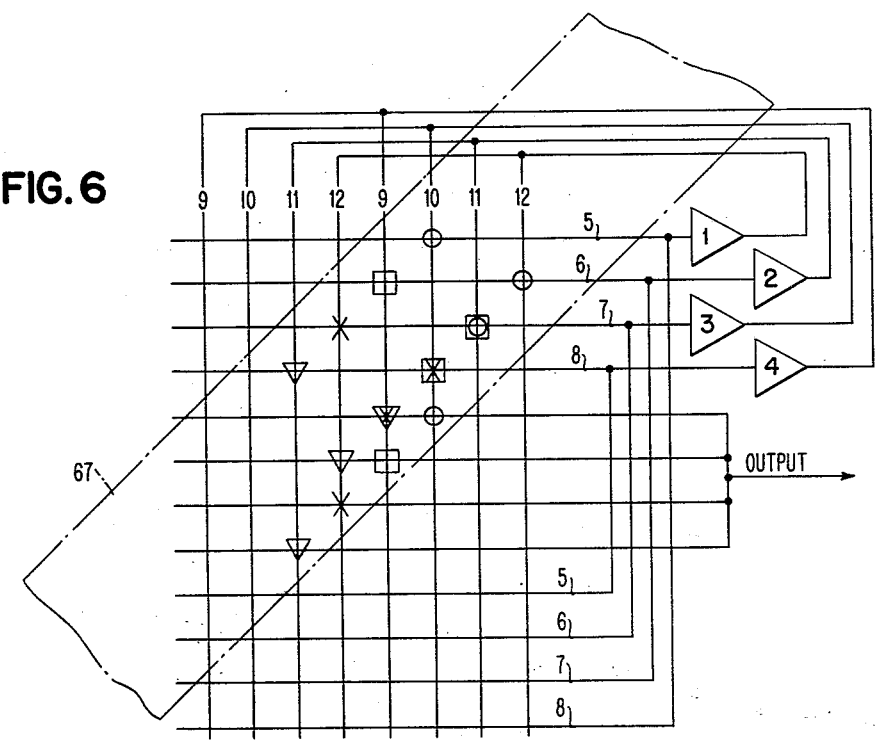
Figure 7:
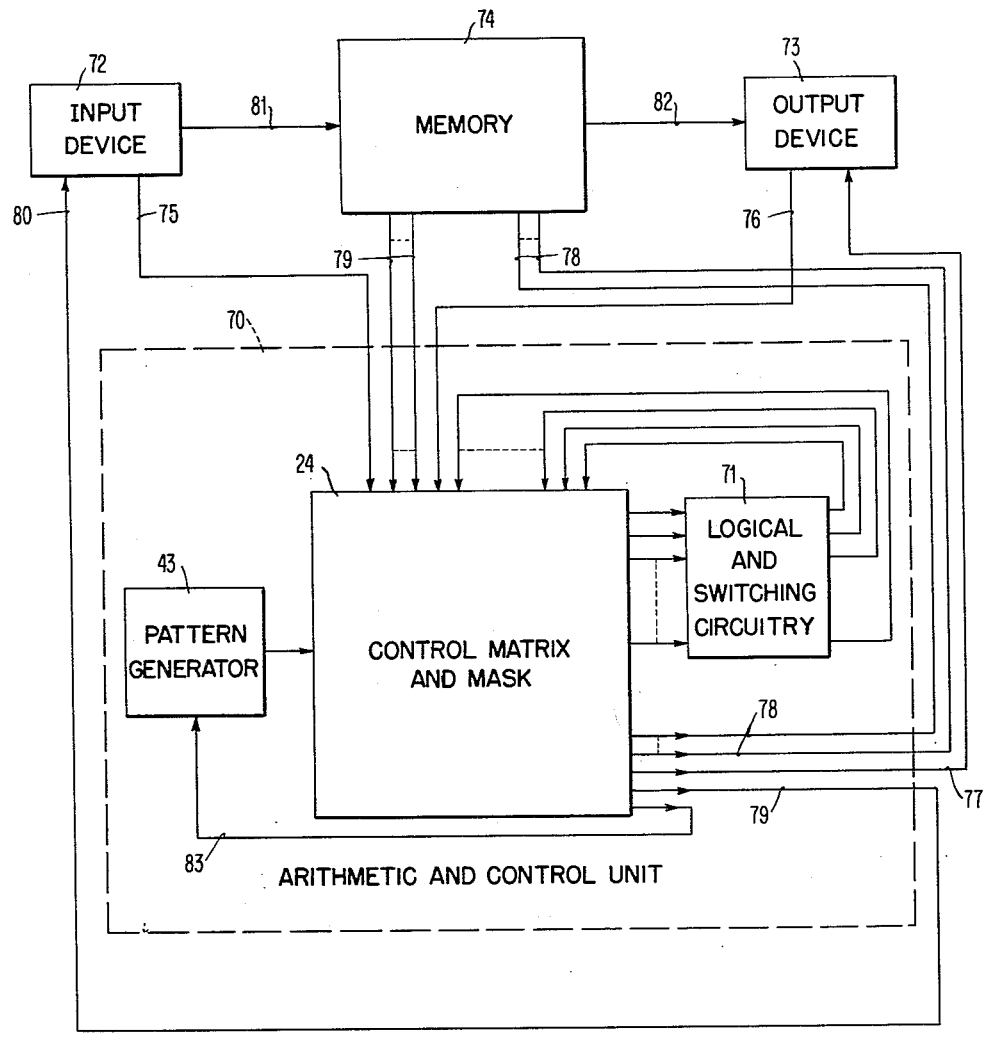

In the drawings,

FIGURE 1 is a schematic diagram of a portion of a signal-translating system in accordance with the present invention;

FIGURES 2(a) and 2(b) are circuit diagrams of a transistor logical block for use in the system of FIGURE 1;

FIGURE 3 is a circuit diagram of a portion of a representative signal-translating system employing several of the logical blocks of FIGURE 2(b);

FIGURES 4(a) to 4(d) and FIGURES 4(a') and 4(d') are schematic diagrams representative of additional portions of the signal-translating system under different operating conditions, while FIGURE 4(a'') is a representation of various pulse trains which may be developed in that system;

FIGURES 5(a) to 5(d) are schematic diagrams of a system for detecting and correcting failures in a signal-translating system of the type under consideration;

FIGURE 6 represents a portion of a modified failure-detecting and correcting system; and FIGURE 7 is a block diagram of a computer employing the signal-translating system of the present invention.

Description of System of FIGURE 1

Referring now more particularly to FIGURE 1 of the drawings, the portion of the electrical-signal translating system there represented has a generalized matrix configuration and includes a plurality of amplifiers 1, 2, 3 and 4. Individual signal-input means of the amplifier are connected to individual ones of a first plurality of connections or conductors 5, 6, 7 and 8 and individual signal-output means thereof are connected to a second plurality of conductors 9, 10, 11 and 12 as represented. It will be understood that when the signal-translating system is used in a data processing apparatus such as a computer, the system comprises a large array or a number of small arrays of amplifiers together with a sufficient number of conductors which are preferably orthogonally arranged. Only four groups of the mutually perpendicular conductors have been shown in FIGURE 1 to simplify the representation. Variable resistive switching or gating elements, which may comprise photoconductive elements 13, are coupled between each output-circuit means and each input-circuit means to permit the selective connections of the signal output of any amplifier to the signal input of any other amplifier in a manner to be explained subsequently.

Description of Circuits of FIGURES 2(a) and 2(b)

Referring now to FIGURE 2(a), there is represented a saturating resistively-coupled transistor amplifier which is particularly suitable for use in the system of FIGURE 1 for any of the amplifiers 1, 2, 3 or 4. The resistive input network comprises resistors 14, 15, 16 and 17 connected to the base of the transistor, and a load resistor 18 connected to its collector, are chosen in a manner well known in the art so that an output signal taken from terminal 19 is capable of driving three or more circuits similar to that represented. Since the emitter of the represented NPN transistor is grounded, the device serves as a signal inverter. It will be understood that the biasing for the amplifier, with either type of transistor such as an NPN or a PNP device, together with the voltage levels of the signals applied to the input resistors 14, 15 and 16, may be such that the amplifier may be conditioned to be in either a normally non-translating condition or a normally translating condition as required for a particular application. An amplifier circuit of the type under consideration which has particular utility in the signal-translating system under consideration is the logical block represented, which block is normally nonconductive as determined by the negative bias applied to the base through resistor 17 and the resistor combination 14, 15 and 16. If, for example, we define +12 volts as a binary "1" and define the zero or ground level as a binary "0," then the circuit performs the function of $\overline{A} + \overline{C} + \overline{B}$ and is sometimes called a NOR circuit. The NOR circuit of FIGURE 2(a) is logically complete, that is, any logical expression can be achieved by a combination of NOR circuits, as is well understood in the art. A consideration of the NOR circuit appears in an article by W. D. Rowe entitled "Transistor NOR Circuit Design" at pages 26–29 of vol. 6, No. 3 of the February 5, 1958 issue of the magazine Electronic Design.

The described logical block is attractive in the signal-translating system of the present invention because of its low cost, simplicity, high reliability, and ability to drive other transistor NOR blocks using transistors of the same type. These inverting amplifiers permit relatively inexpensive resistive switching elements to be employed in their input circuits to perform logic.

Referring now to the companion amplifier circuit of FIGURE 2(b), it will be seen that the input resistors 14, 15 and 16 of FIGURE 2(a) have been replaced by variable resistance elements such as photoconductors. When these photoconductors are exposed to light, their resistance drops from a high value which may be several megohms to a relatively low value of several kilohms, and then when the photoconductors are connected to bias voltage such as +12 volts, the circuit is thus capable of serving as a NOR logical block. The number of signal inputs to the FIGURE 2(b) inverter which may be active at any given time is determined by the number of photoconductive elements which are illuminated. This is ordinarily limited to a suitable number such as three to assure reliable operation.

Description of System of FIGURE 3

FIGURE 3 of the drawings is a circuit diagram of a portion of an electrical signal-translating system similar to the generalized matrix representation of FIGURE 1, and it embodies a plurality of transistor signal-translating amplifiers 1, 2, 3 and 4 of the type represented in FIGURE 2(b). It will be noted that corresponding elements in the figures just mentioned are designated by the same reference numerals. The biasing means for the transistors 1, 2, 3 and 4 and the resistive networks including resistors 17, 18 and 18 serve normally to maintain the amplifiers in a predetermined or non signal-translating condition. Input signals may be applied to the signal-translating system by way of an input terminal 20 connected to a conductor 21 which is coupled to the base input conductors 5, 6, 7 and 8 of the transistors by way of additional variable-resistance elements 13 as represented. An output signal may be derived at terminal 22 connected to a conductor 23 which is coupled to the collector output terminals of the transistors 1, 2, 3 and 4 by way of additional variable-resistance elements as illustrated. While single input terminals, output terminals and input and output conductors have been shown to simplify the representation, it is to be understood that additional such input members may be employed and ordinarily are used in a system that is more complex than the simplified one represented.

The photoconductive elements 13 may be individual photodetector cells which normally have a high resistance that is reduced to a much lower value when the cell is exposed to visible or non visible radiation. Cadmium selenide is a photoconductive material which may be used in such cells or it may be employed as a layer sandwiched between two insulating plates, one of which has a parallel array of spaced conductors engaging the photoconductor material while the other has a similarly disposed parallel array of transparent conductors normal to the first mentioned conductors and engaging the photoconductive material. Radiant energy such as a pattern of visible light may be projected on selected portions of certain of the transparent conductors to excite the photoconductive material between the matrix points. This is effective to lower the dark-to-light resistance of the photoconductive material at those points as much as 1000 to 1. For example, the resistance at the matrix points may be decreased from about 10 megohms to several thousand kilohms by the application of light. This reduced value of resistance is appropriate for use of the operating input connections to a transistor NOR circuit such as those represented.

Description of System of FIGURE 4

The manner in which a signal-translating system, which is in accordance with the present invention and includes the electrical circuit portion represented in FIGURE 3, may be employed to effect a large number of different circuit arrangements or logical combinations to perform differential functional operations may best be explained in connection with FIGURES 4(a) to 4(d) and the related FIGURES 4(a') to 4(d'). To aid in understanding the operation, the matrix 24 of photoconductive elements represented in FIGURES 4(a) to 4(d) has been reduced in size to an orthogonal array of four horizontal and four vertical conductors, the intersections of which represent the photoconductive elements. Those photoconductive elements in FIGURE 4(a) which have been excited by light rays in the frequency range to which they respond are in the paths of the broken lines which represent those rays. It will be noted that input and output connections have been omitted from the matrix for further simplification, although it will be understood that connections such as conductors 21 and 23 and associated photoconductive elements as shown in FIGURE 3 may be and are ordinarily employed.

It will now be assumed that it is desirable to utilize the signal-translating network of FIGURE 3 to connect any three of the transistors 1, 2, 3 and 4 in a feedback circuit, such as that represented in FIGURE 4(a'), to form an oscillator capable of developing at the collectors of the transistors clock or timing pulses such as the three trains of pulses represented in FIGURE 4(a''). Again for simplification purposes, only one output terminal 25 has been shown in FIGURE 4(a') to serve as a means for translating to a utilizing circuit but one of the trains of pulses. The system of FIGURE 4(a) includes means for applying selected patterns of control effects to the switching elements or photoconductors for selectively placing predetermined ones of the transistors in a different signal-translating condition to modify the signal translated between a signal-input and a signal-output means. This means comprises a light projector 26 for applying predetermined patterns of light to the matrix 24 of photoconductive elements. The projector may comprise suitable means such as a cathode tube, the raster of which may be selectively varied in a well-known manner, or it may comprise a neon or electroluminescent matrix adjacent the light-sensing matrix to serve as the companion light emitter therefor. However, the light projector as represented may conveniently be a film or slide projector 26 cooperating with a mask 27 which may be a continuous film or a card having perforations or light-transmitting areas 28 corresponding in location on the mask to those of the photoconductive elements on the matrix which are to be excited. While the mask 27 is ordinarily movable in a suitable track or carriage within the projector 26, it has been represented as being external thereto simply to promote the understanding of the operation of the system.

Figure 4A:
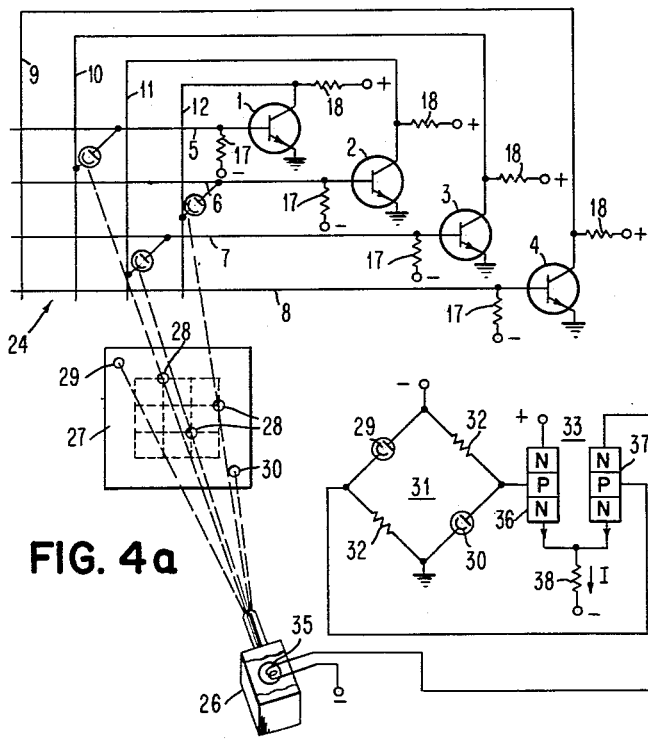
Figure 4A:
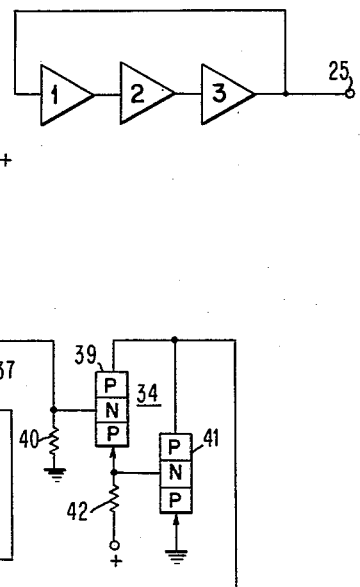
Figure 4B:
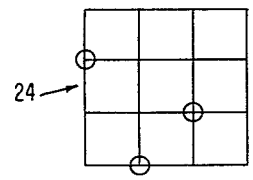
Figure 4B:
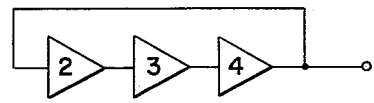

When light excites the matrix 24 as represented in FIGURE 4(a), the resistance of the photoconductive elements effected is reduced to a value such as about 7 kilohms. It will be observed that the collector output of transistor 1 is connected through the excited photoconductive element to the base input transistor 2, the collector output of the latter is similarly connected to the base input of transistor 3, while the collector of the latter is connected through an excited photoconductive element to the base input of transistor 1, thus creating the three transistor oscillator circuit represented schematically in FIGURE 4(a').

It is ordinarily desirable accurately to control the resistance afforded by an excited photoconductive element to assure proper circuit operation. This may be accomplished by suitable means optically associated with the matrix and coupled to the light-projecting means and responsive to the light projected on the matrix for maintaining the average intensity at the illuminated matrix points substantially constant. This means comprises a pair of light-sensing means 29 and 30 disposed in opposing arms of a Wheatstone bridge arrangement 31 which also includes two fixed resistors 32, 32 in the other arms, and further comprises a differential amplifier 33 and a signal-output amplifier 34 which is connected to the filament of the light bulb 35 in the light projector 26. Two of the diagonal points of the bridge 31 are connected to a negative source and to ground, as represented, while individual ones of the remaining two diagonal points are connected to the bases of NPN transistors 36 and 37 of the differential amplifier 33. The emitters of the two transistors are connected to a negative source through a resistor 38 while the collector of transistor 36 is connected to a source of positive potential. The collector of the transistor 37 is connected to the base of a PNP transistor 39 of the amplifier 34. The base of the transistor 39 is connected to ground through a resistor 40 while its emitter is directly connected to the base of a transistor 41 and is also connected to a positive biasing source through a resistor 42. The collectors of the transistors 39 and 41 are connected to a negative potential source through the filament of the light bulb 35, while the emitter of transistor 41 is grounded.

The light-sensing means 29 and 30 preferably comprise photoconductive elements which may be of the type which have previously been described and may be disposed in the plane of the photoconductive matrix 24. For convenience of illustration, however, these sensing means have been represented as being in the diagonally opposite corners of the mask 27.

*Explanation of Operation of System of FIGURE 4*

Assuming for the moment that the intensity of the light shining on the photoconductive sensing elements 29 and 30 is such that their resistance decreases from their previous value, then the positive potential at the base of the transistor 37 will increase. This causes the latter to supply a greater proportion of the current I flowing through the resistor 38 and in turn a greater current flow through the resistor 40. The increased current flow through the latter increases the conductivity of the transistor 39 and also increases the flow of current through the emitter resistor 42 so as to render the base of the transistor 41 more negative. This in turn increases the conductivity of transistor 41. The increased current flow in the latter increases the filament current of the bulb 35 and therefore increases the intensity of the light produced on the matrix 24 by the source 26. Should the intensity of the light on the matrix 24 increase for any reason, the action of the Wheatstone bridge 31, the differential amplifier 33, and the signal amplifier 34 is the reverse of that described, and the current flow from the bulb 35 is decreased so as to decrease the intensity of the light. Thus the action of the described light-sensing system is to maintain the average intensity of the light striking the selected matrix points substantially constant and thereby maintain the conductive resistance of the photoconductive element at substantially the correct value to assure proper operation of the resistively coupled transistor circuit.

It will now be assumed that it is desirable to rearrange the various circuits associated with the transistors 1, 2, 3 and 4 to create a new circuit either to perform a different functional operation or to replace a transistor or its immediate circuit which may have failed. To that end, it will be assumed that the transistor 1 has failed and that it is desirable to rearrange the circuit combination by replacing transistor 1 with transistor 4 to create the new circuit of FIGURE 4(b'). By substituting for the mask 27 of FIGURE 4(a) a mask having a pattern of light projection apertures arranged to permit illumination of the matrix 24 in accordance with the pattern represented by the circles in FIGURE 4(b), when one traces the circuit through the transistors and the rearranged matrix pattern as was done in connection with the FIGURE 4(a), he will encounter the circuit of FIGURE 4(b'). It will be seen that the collector output circuit of transistor 2 is connected to the base input of transistor 3, the collector output of the latter is connected to the base input of transistor 4, and the collector output of the latter is connected to the base input of transistor 3, hence rearranging the circuit elements to provide a new and operative circuit by selective energization of the matrix. The output signal has been represented as being taken from the collector of the transistor 4.

Figure 4C:
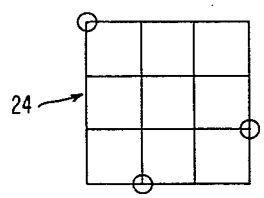
Figure 4C:
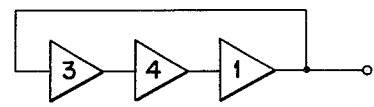

Assuming now that the transistor 1 has been replaced by an operative transistor and that transistor 2 or its immediate circuit has failed, the circuit combination may be rearranged to form the one represented in FIGURE 4(c') by simply changing the mask so as to produce on the matrix 24 of FIGURE 4(c) the pattern of light there represented. Tracing the revised circuit arrangement will indicate that the transistors 3, 4 and 1 are interconnected as represented in FIGURE 4(c').

Figure 4D:
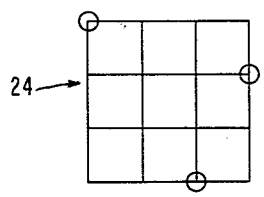
Figure 4D:
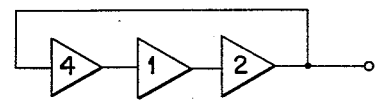

Assuming next that transistor 2 has been replaced with a good transistor and that transistor 3 has become defective, the circuit combination may again be arranged to form that of FIGURE 4(d') by changing the mask so as to develop on the matrix 24 of FIGURE 4(d) the light pattern there represented. Inspection will indicate that the operative combination now includes transistors 4, 1 and 2.

From the foregoing explanation, it will be seen that a signal-translating system in accordance with the present invention has extensive possibilities with reference to circuit rearrangement for repair purposes and also for performing desired functional operations. While a simple circuit has been chosen to demonstrate some of the possibilities of the signal-translating system, it will of course be realized by those skilled in the art that a great number of circuit interconnections may be effected with the transistor logical blocks to establish a wide variety of circuits including operative combinations capable of performing any desired logical function.

Description of System of FIGURE 5

It has been disclosed in connection with FIGURES 4(a) to 4(d) that various combinations of circuits of the signal-translating system may be rearranged to correct for a faulty component or circuit. Manifestly, it would be desirable if such a system was capable of self-repair, that is, had the ability automatically to isolate the faulty circuit and replace it with an operative one. FIGURES 5(a) to 5(d) disclose such a system conditioned to establish several operative circuit combinations corresponding to those represented in FIGURES 4(a) to 4(d) and 4(a') to 4(d').

Figure 5A:
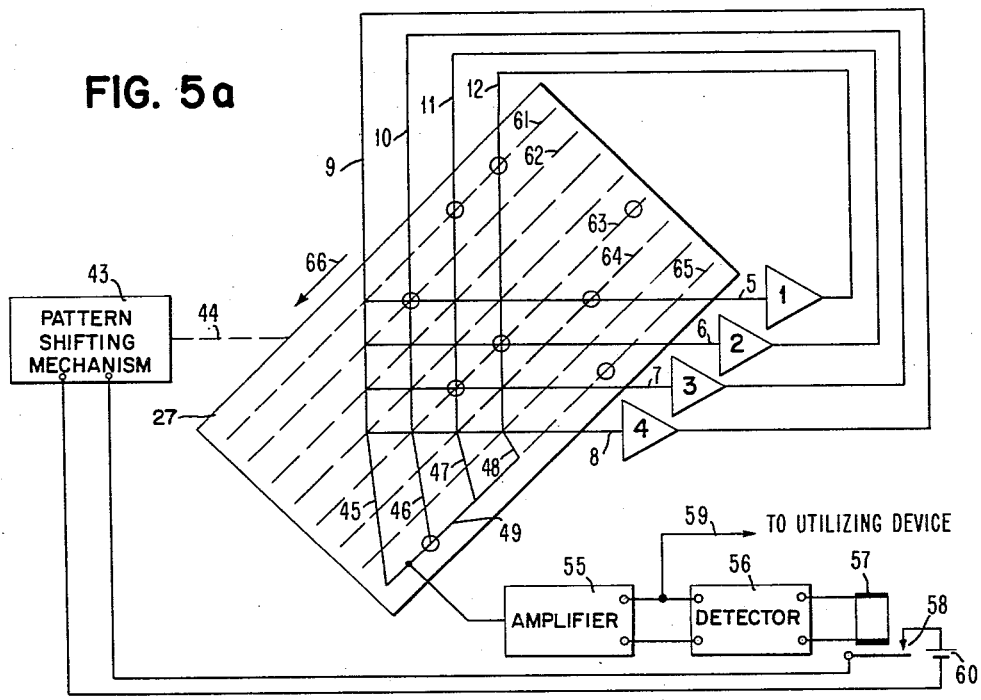

Referring now more particularly to FIGURE 5(a), the system includes a plurality of interchangeable signal translating devices which again may constitute the transistor NOR blocks 1, 2, 3 and 4 previously described. The system also includes means including a plurality of connections for selectively connecting various of the devices according to a predetermined plan to form at least one operatively connected signal-translating circuit, one of those devices constituting a spare for use in the event of the failure of said at least one of the operative circuits or the device therein. This last-mentioned means comprises a matrix of photoconductive elements and orthogonally arranged conductors corresponding to those previously described in connection with the transistors 1, 2, 3 and 4 in the preceding figures. A simple form of the matrix and its connections, such as those shown in FIGURE 4(a), has been represented in FIGURES 5(a) to 5(d), and hence will be designated throughout by the same reference numerals. The selective connection of the various transistors in accordance with a predetermined plan is accomplished by projecting light from a light source which corresponds with the source 26 represented in FIGURE 4(a). To simplify the representation in FIGURES 5(a) to 5(d), this source and its intensity control circuit have not been illustrated because of their earlier representation and description. A mask 27 having transparent areas or apertures 45 therein arranged in accordance with a predetermined pattern or patterns is again employed selectively to reduce the resistance of predetermined crossover or matrix points of the matrix 24. While this mask is represented as a card, it will be apparent that it may be a continuous film suitably arranged for relative movement with respect to the matrix 24. As represented, however, the mask is a card arranged for movement by suitable indexing mechanism in a slide projector in response to a suitable control signal to be explained subsequently. To this end, the indexing mechanism is represented in the drawing as the block designated as the pattern-shifting mechanism 43. The latter employs conventional means, represented by the broken line 44, for moving the mask 27 diagonally with respect to the orthogonally arranged conductors and the matrix 24.

The vertical conductors 9, 10, 11 and 12 have extensions 45, 46, 47 and 48 at their lower ends which are associated with another conductor 49 that is approximately normal thereto and extends parallel to the direction of movement of the mask 27. The matrix 24 includes additional photoconductive elements effectively at the four crossover points of the conductors 45 to 48, inclusive, with the conductor 49 for translating an output signal in a manner to be explained subsequently.

The signal translating system additionally includes means for sensing a failure of any of the transistor circuits and for deriving a control signal therefrom. This means comprises the cascade combination of an amplifier 55, a detector 56, and a relay 57 which has a pair of contacts 58, 58 that are normally closed when the relay is de-energized. A signal input to the amplifier 55 is connected to the conductor 49 and the output signal of the amplifier is also supplied to a suitable utilizing device by a connection 59. The relay contacts 58, 58 are connected through a battery 60 to an actuating means such as a solenoid-operated indexing mechanism in the pattern-shifting mechanism 43. As will be made clear hereinafter, the pattern-shifting mechanism 43 comprises means effectively responsive to the signal developed by units 55, 56 and 57 for effecting a rearrangement of the transistors 1, 2, 3 and 4, in accordance with another predetermined plan established by the arrangement of the apertures in the mask 49, to include the spare transistor in a replacement circuit for the operatively connected circuit which failed.

The light-transmitting means or apertures in the mask 49 are arranged in a series of columns 61, 62, 63, 64 and 65 represented by the parallel broken lines, and the spacing between the apertures in each column is such that the selective energization of the desired matrix points may be effected as the mask is moved diagonally downward in the direction indicated by the arrow 66.

Explanation of Operation of System of FIGURE 5

Considering how the operation of the self-repairing signal-translating system of FIGURE 5(a), it will be seen that the positions of the sensitized matrix points correspond exactly with those of FIGURE 4(a) with exception of that of the lower matrix point which is used to connect the system to an output circuit. Accordingly, it will be clear that the transistors 1, 2 and 3 are connected in the manner represented in FIGURE 4(a'). Since the matrix point at the intersection of conductors 46 and 49 is sensitized as a result of the presence thereof the aperture in the mask 49, which point effectively corresponds to the output terminal 25 of FIGURE 4(a'), the output signal is taken from the collector of the transistor 3 and is translated to the amplifier 55 where it is amplified and then applied to the detector 56. The latter derives a unidirectional signal for energizing the relay 57.

When the relay is energized, its contacts 58, 58 remain open and the circuit to the indexing mechanism of the pattern shifting mechanism 43 remains deenergized.

Figure 5B:
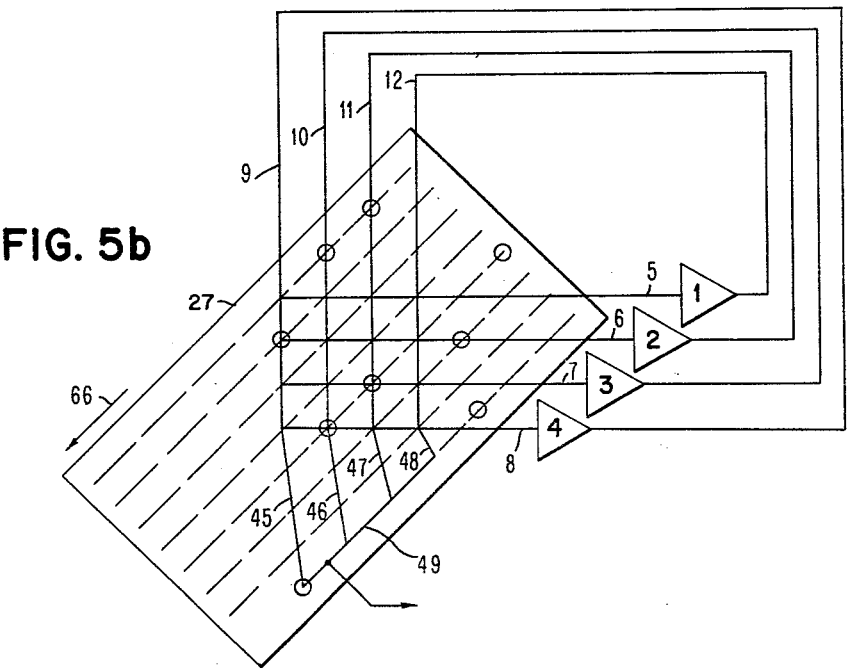

Assuming now that the transistor 1 corresponding to that of FIGURE 4(a') is broken and an output signal from the oscillator no longer appears at the conductor 49 connected to the input circuit of the amplifier 55. Accordingly, the detector 56 does not produce an output signal and the relay 57 is deenergized, thus permitting the contacts 58, 58 to close. This energizes the solenoid in unit 43 and the indexing mechanism thereof automatically shifts the mask 49 diagonally downward with respect to the matrix 24 to the position represented in FIGURE 5(b). It will be seen that pattern of the sensitized points on the matrix of FIGURE 5(b) is now that represented in FIGURE 4(b), thus establishing the circuit arrangement of FIGURE 4(b') wherein transistor 4 has replaced transistor 1. Since the matrix point at the intersection of conductors 45 and 49 is sensitized, an output signal is taken from the collector of transistor 4 for application to the amplifier 55.

Figure 5C:
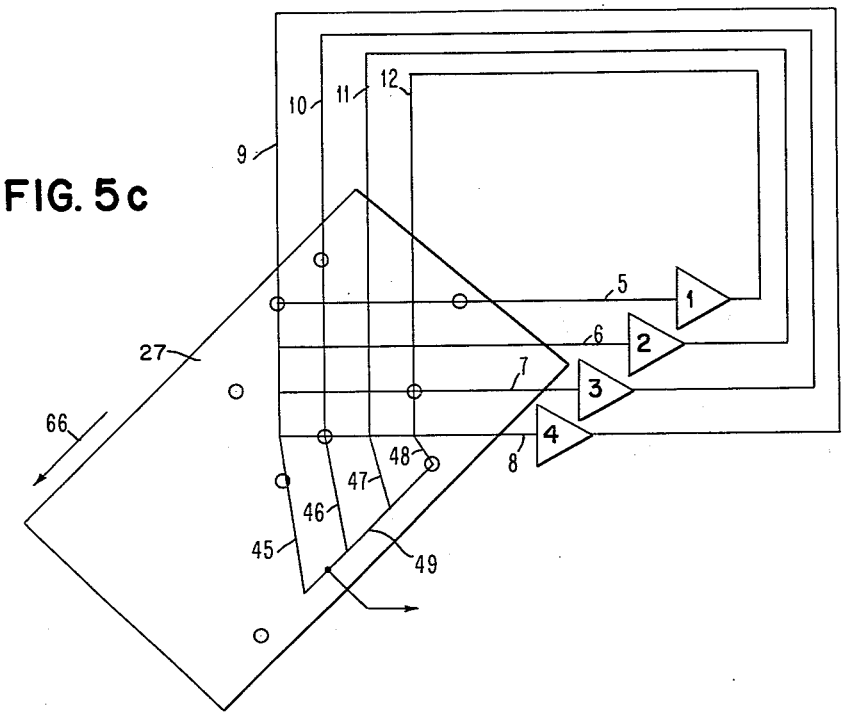

Assuming transistor 1 has been replaced with an operative one and that the transistor 2 now fails, the absence of an output signal on the conductor 49 will cause the closing of the relay contacts 58, 58 and the shifting of the mask 49 from the position represented in FIGURE 5(b) to the one illustrated in FIGURE 5(c). A comparison of the sensitized matrix pattern of FIGURE 5(c) with that of FIGURE 4(c) will indicate that they are identical. It will be manifest that the circuit arrangement of FIGURE 4(d') is now established. Since the matrix point at the intersection of the conductors 48 and 49 is now energized, the output signal is taken from the collector of the transistor 1.

Figure 5D:
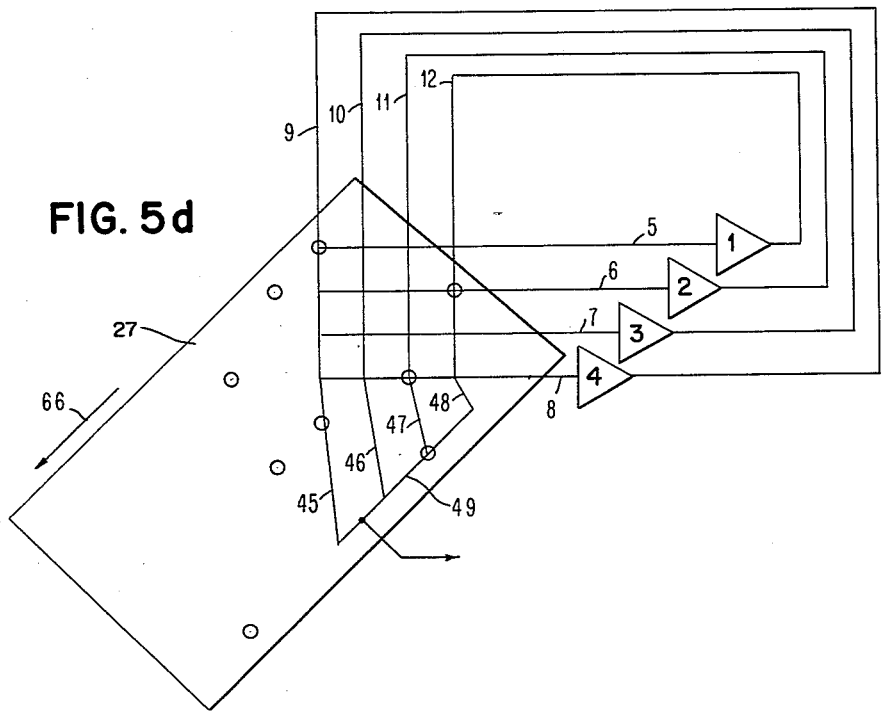

If we now assume that transistor 2 is an operative device and that the transistor 3 fails, the absence of a signal on the conductor 49 is effective to close relay contacts 58, 58 and actuate the pattern shifting mechanism 43 so as to shift the mask 49 from the position of FIGURE 5(c) to that of FIGURE 5(d). Again a comparison of the sensitized matrix patterns of FIGURES 5(d) and 4(d) will reveal that they are identical. The circuit of FIGURE 4(d') is now established with the transistor 2 replacing the defective transistor 3. The sensitized matrix intersection of the conductors 47 and 49 permits the output signal of the transistor combination to be taken from the collector of transistor 2.

Suitable legends may be placed adjacent individual intersections of conductor 49 with conductors 45, 46, 47 and 48 to indicate that the following transistors, in the order named, are disconnected, namely transistors 1, 4, 3 and 2. When the matrix point at the intersection of conductors 49 and 47 is sensitized as indicated in FIGURE 5(d), for example, an illuminated spot is visible at that intersection and will inform the operator that transistor 3 is disconnected. Thus transistor 3 may be given a periodic check to establish whether or not it is faulty. This check in turn will reveal whether the transistor 3 needs to be replaced so as to have an operative spare available when required.

From the foregoing explanation, it will be seen that the signal-translating system not only is versatile in that it is capable of rearranging its circuits to create a large number of desirable circuit combinations, but also that it is capable of automatically repairing itself by systematically establishing new and operative circuit arrangements by making use of circuit spares and isolating the defective circuit.

*Description of System of FIGURE 6*

Referring now to FIGURE 6, there is represented a portion of a signal-translating system which is similar to that of FIGURES 4(a) and 5(a). It differs therefrom primarily in the arrangement of the matrix of photoconductive elements and the arrangement of the pattern of light required to excite the various elements. An endless mask or tape 67, which is represented as containing a single repeating pattern of four holes, is employed selectively to energize the selected matrix points and thereby complete the wanted circuit connections. An additional set of four horizontal and four vertical conductors which are interconnected and identified as indicated, together with four interconnected horizontal output conductors permit the use of a mask with a repeating pattern of four holes. One group of holes is represented by the small circle, a second group by the small squares, a third by the cross marks, and the fourth group by the small triangles. An indexing movement of the tape diagonally across the matrix establishes the type of circuit connections which have been described above in connection with FIGURES 4 and 5 and hence will not be repeated.

*Description of Computer of FIGURE 7*

Referring now to FIGURE 7 of the drawings, there is represented a block diagram of a computer which includes the signal-translating system of the present invention serving as the arithmetic and control unit 70 of the computer. Unit 70 is represented as comprising the combination of a pattern shifting mechanism 43, a combined control matrix mask 24, and logic and switching circuitry 71 which correspond to the transistor NOR circuit represented in FIGURE 4(a). The similarity of the arrangement of the units just described to those of the earlier figures will be manifest. The computer also includes the usual input device 72 and output device 73 together with the memory 74. Connections 75 and 76 supply signals from the respective input and output devices 72 and 73 on the control matrix 24 while a connection 77 supplies control information from the matrix to the output device 73. Other output connections 78, 78 translate information from the control matrix 24 to the memory 74 while connections 79, 79 supply information from the memory to the input conductors of the control matrix. A connection 80 supplies control information from the control matrix to the input device 72. The input device 72 is connected to the memory 74 through a connection 81 while the memory is connected to the output device 73 through a connection 82. A control connection 83 exists between an output circuit of the control matrix and the pattern shifting mechanism 43.

*Explanation of Operation of FIGURE 7 Computer*

The input device 72, under the control of circuits in the control matrix 24, transfers information from suitable storage media therein such as magnetic tape, punched cards or punched paper tape to the memory 74. Also under the control of the circuits established by the control matrix, information from the memory 74 is translated to the arithmetic unit which includes portions of the control matrix and the logical circuitry. In the arithmetic portion of unit 70, information is processed, that is, it may be inspected, manipulated by a series of additions, subtractions, multiplications and divisions or may be rearranged, expanded or contracted as required. After the information processing has been completed in unit 70, it is translated to the memory 74 and from there to the output device 73 where it is put on magnetic tape, punched cards or punched paper tape. These operations are executed under the direction of the control section of unit 70, that is the particular circuit arrangements of the control matrix serving as the control unit, which circuit arrangements are set up or established by a pattern generator comprising the pattern shifting mechanism 43 and the mask of unit 24. Program changes may be effected by way of the mask associated with the pattern shifting mechanism 43. Unit 24 responds to circuit failures as previously explained and develops a control signal for application by connection 83 to the pattern shifting mechanism 43 to rearrange the circuits as mentioned in connection with FIGURE 5(a).

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electrical signal-translating system comprising: a plurality of signal amplifiers including signal-input means and signal-output means wherein the output signals are a fixed logical function of the input signals, and means normally maintaining said amplifiers in a predetermined signal-translating condition; a first plurality of conductors individually coupled to individual ones of said signal-input means and a second plurality of conductors individually coupled to individual ones of said signal-output means; and a plurality of switching elements which are individually coupled by said conductors between individual ones of said signal-input means and said signal-output means; and radiant-energy projecting means producing selectable patterns of radiant-energy control effects, said switching elements being responsive to said control effects selectively to place predetermined ones of said amplifiers in a different signal-translating condition to modify signal translation between said signal-input and signal-output means, whereby said system performs selected signal-translating operations.

2. An electrical signal-translating system comprising: a plurality of transistor signal amplifiers including signal-input means and signal-output means, wherein the output signals are a fixed logical function of the input signals, and means normally maintaining said transistors in a predetermined signal-translating condition; a first plurality of conductors individually coupled to individual ones of said signal-input means and a second plurality of conductors individually coupled to individual ones of said signal-output means; and a plurality of switching elements which are individually coupled by said conductors between individual ones of said signal input-means and individual ones of said signal-output means; and light-projecting means producing selectable patterns of control effects, said switching elements being responsive to said control effects selectively to place predetermined ones of said transistors in a different signal-translating condition to modify signal translation between said signal-input and signal-output means, whereby said system performs selected signal-translating operations.

3. An electrical logical signal-translating system comprising: a plurality of transistor signal inverters including signal-input means and signal-output means wherein the output signals are a fixed logical function of the input signals, and biasing means normally maintaining said transistors in a non-signal-translating condition; a first plurality of conductors individually coupled to individual ones of said signal-input means and a second plurality of conductors individually coupled to individual ones of said signal-output means; and a plurality of switching elements which are individually coupled by said conductors between individual ones of said signal-input means and said signal-output means; and light-projecting means producing selectable patterns of control effects, said switching elements being responsive to said control effects selectively to place predetermined ones of said transistors in a signal-translating condition to modify signal translation between said signal-input and signal-output means, whereby said system performs different functional operations on the translated signal.

4. An electrical logical signal-translating system comprising: a plurality of transistor signal inverters including signal-input means and signal-output means wherein the output signals are a fixed logical function of the input signals, and biasing means normally maintaining said transistors in a nonsignal-translating condition; a first plurality of conductors individually and conductively connected directly to individual ones of said signal-input means and a second plurality of conductors individually and conductively connected directly to individual ones of said signal-output means; and a plurality of variable resistance switching elements which are individually and conductively connected directly by said conductors between individual ones of said signal-input means and individual ones of said signal-output means; and radiant-energy projecting means producing selectable patterns of radiant-energy control effects, said switching elements being responsive to said control effects for changing their resistance from a high value to a predetermined low value of several kilohms selectively to place predetermined ones of said transistors in a signal-translating condition to modify signal translation between said signal-input and signal-output means, whereby said system performs different functional operations on the translated signal.

5. An electrical logical signal-translating system for use in data processing apparatus comprising: a plurality of transistor signal inverters including signal-input means and signal-output means wherein the output signals are a fixed logical function of the input signals, and means normally maintaining said transistors in a predetermined signal translating condition; a first plurality of conductors individually coupled to individual ones of said signal-input means and a second plurality of conductors individually coupled to individual ones of said signal-output means; a plurality of switching elements which are individually coupled by said conductors between individual ones of said signal-input means and individual ones of said signal-output means; and means for applying selectable patterns of control effects to said switching elements for selectively placing predetermined ones of said transistors in a different signal-translating condition to modify signal translation between said signal-input and signal-output means, whereby said system performs different functional operations on the translated signal.

6. An electrical signal-translating system comprising: a plurality of transistor signal inverters including signal-input means and signal-output means wherein the output signals are a fixed logical function of the input signals, and means normally maintaining said transistors in a predetermined signal-translating condition; a first plurality of conductors individually and conductively connected directly to individual ones of said signal-input means and a second plurality of conductors individually and conductively connected directly to individual ones of said signal-output means; and a plurality of light-responsive switching elements which are individually connected by said conductors directly between individual ones of said signal-input means and individual ones of said signal-output means; and light-projecting means for projecting selectable patterns of light on said switching elements for selectively placing predetermined ones of said transistors in a different signal-translating condition to modify signal translation between said signal-input and signal-output means, whereby said system performs selected signal-translating operations.

7. An electrical signal-translating system for use in data processing apparatus comprising: a plurality of transistor signal inverters including signal-input means and signal-output means wherein the output signals are a fixed logical function of the input signals, and means normally maintaining said transistors in a predetermined signal-translating condition; a first plurality of conductors individually coupled to individual ones of said signal-input means and a second plurality of conductors individually coupled to individual ones of said signal-output means; and a plurality of light-responsive variable-resistance switching elements which are individually coupled by said conductors between individual ones of said signal-input means and individual ones of said signal-output means; and light-projection means including a perforated mask for projecting selectable patterns of light through said mask on said switching elements for selectively reducing their resistance from a high value to a predetermined value of several kilohms and placing predetermined ones of said transistors in a different signal-translating condition to modify signal translation between said signal-input and signal-output means, whereby said system performs selected signal-translating operations.

8. An electrical signal-translating system for use in data processing apparatus comprising: a plurality of transistor signal inverters including signal-input means and signal-output means wherein the output signals are a fixed logical function of the input signals, and means normally maintaining said transistors in a predetermined signal-translating condition; a first plurality of conductors individually coupled to individual ones of said signal-input means and a second plurality of conductors individually coupled to individual ones of said signal output means; a plurality of light-responsive variable-resistance switching elements which are individually coupled by said conductors between individual ones of said signal-input means and individual ones of said signal-output means; and light-projecting means for projecting selectable patterns of light on said switching elements for selectively reducing their resistance from a high value to a predetermined value of several kilohms and thereby placing predetermined ones of said transistors in a different signal-translating condition to modify signal translation between said signal-input and signal-output means, whereby said system performs selected signal-translating operations; and means responsive to the light projected on said switching elements and coupled to said light-projecting means for maintaining the average light intensity and said predetermined resistance value substantially constant.

9. A self-repairing electrical signal-translating system for use in data-processing apparatus comprising: a plurality of interchangeable signal-translating devices; means responsive to radiant energy and including a plurality of connections for selectively connecting various of said devices according to a predetermined plan to form at least one operatively connected signal-translating circuit, one of said devices constituting a spare for use in the event of the failure of said at least one of said operatively connected circuit or the device therein; means for sensing said failure and deriving a control signal therefrom; and means for controlling the pattern of said radiant energy and responsive to said signal for effecting circuit rearrangement in accordance with another predetermined plan to include said spare in a replacement circuit for the operatively connected circuit which failed.

10. A self-repairing electrical signal-translating system comprising: a plurality of interchangeable signal-translating devices; means including light-responsive means and a plurality of connections for selectively connecting various of said devices according to a predetermined plan to form at least one operatively connected signal-translating circuit, one of said devices consistuting a spare for use in the event of the failure of said at least one of said operatively connected circuit or the device therein; means for sensing said failure and deriving a control signal therefrom; and means for controlling the pattern of light striking said light-responsive means and responsive to said signal for effecting circuit rearrangement in accordance with another predetermined plan to include said spare in a replacement circuit for the operatively connected circuit which failed.

11. A self-repairing electrical signal-translating system for use in data-processing apparatus comprising: a plurality of interchangeable signal-translating devices; a matrix of photoconductive elements and a plurality of connections thereto for selectively connecting various of said devices according to a predetermined plan to form at least one operatively connected signal-translating circuit, one of said devices constituting a spare for use in the event of the failure of said at least one of said operatively connected circuit or the device therein; means for sensing said failure and deriving a control signal therefrom; and light-projecting means including means which controls the pattern of light projected on said matrix and is responsive to said signal for effecting circuit rearrangement in accordance with another predetermined plan to include said spare in a replacement circuit for the operatively connected circuit which failed.

12. A self-repairing electrical signal-translating system for use in data-processing apparatus comprising: a plurality of interchangeable signal-translating devices; a matrix of photoconductive cells and a plurality of connections thereto for selectively connecting various of said devices according to a predetermined plan to form at least one operatively connected signal-translating circuit, one of said devices constituting a spare for use in the event of the failure of said at least one of said operatively connected circuit or the device therein; means for sensing said failure and deriving a control signal therefrom; light-projecting means including means which controls the pattern of light projected on said matrix and is responsive to said signal for effecting circuit rearrangement in accordance with another predetermined plan to include said spare in a replacement circuit for the operatively connected circuit which failed; and means optically associated with said matrix and coupled to said light-projecting means and responsive to the light projected on said matrix for maintaining the average light intensity thereat substantially constant.

13. A self-repairing electrical logical signal-translating system comprising: a plurality of interchangeable signal-translating devices having signal-input means and signal-output means wherein the output signal is a fixed logical function of the input signal; means responsive to different patterns of radiant energy and including a plurality of connections for selectively connecting various of said signal-input means of some of said devices to various of said signal output means of others of said devices according to a predetermined plan to form operatively connected logical signal-translating circuits, one of said devices constituting a spare for use in the event of the failure of said at least one of said operatively connected circuit or the device therein; means for sensing said failure and deriving a control signal therefrom; and means for controlling the patterns of said radiant energy and responsive to said signal for effecting circuit rearrangement in accordance with another predetermined plan to include said spare in a replacement circuit for the operatively connected circuit which failed.

14. A self-repairing electrical logical signal-translating system for use in the arithmetic unit of a data-processing apparatus comprising: a plurality of interchangeable transistor signal-translating devices having signal-input means and signal-output means wherein the output signal is a fixed logical function of the input signal; a light-responsive matrix of variable impedance elements which includes a plurality of connections for selectively connecting various of said signal-input means of some of said transistor devices to various of said signal output means of others of said transistor devices according to a predetermined plan to form operatively connected logical signal-translating circuits, some of said devices constituting spares for use in the event of failures of operatively connected circuits or the devices therein; means for sensing failures and deriving control signals therefrom; and means for controlling the pattern of light on said matrix and responsive to said signals for repetitively effecting circuit rearrangements in accordance with other predetermined plans to include said spares in replacement circuits for operatively connected circuits which failed.

15. A self-repairing electrical signal-translating system comprising: a plurality of interchangeable signal-translating devices; a matrix of light-responsive variable impedance elements and a plurality of orthogonally arranged connections thereto for selectively connecting various of said devices according to a predetermined plan to form operatively connected signal-translating circuits, some of said devices constituting spares for use in the event of the failures of operatively connected circuits or the devices therein; means for sensing failures and deriving a control signal therefrom; and light-projecting means including an apertured mask which is movable diagonally with respect to said conductors, which controls the pattern of light projected on said matrix, and is responsive to said signals for effecting circuit rearrangement in accordance with other predetermined plans to include said spares in replacement circuits for the operatively connected circuits which failed.

16. An electrical signal translating system comprising: a plurality of interchangeable signal-translating devices; a record which bears an indicia arranged in predetermined patterns; means responsive to said indicia for connecting various of said devices in a single operative signal-translating circuit according to a plan established by one of said patterns; one of said devices constituting a spare for use in the event of the failure of said operative circuit; means for sensing said failure and deriving a control signal therefrom; and means responsive to said signal for effecting circuit rearrangement in accordance with another plan established by another of said patterns to include said spare in a replacement circuit for the operatively connected circuit which failed.

17. An electrical signal-translating system for use in data processing apparatus comprising: a plurality of signal-translating devices including signal-input means, signal-output means, and means normally maintaining said devices in a predetermined signal-translating condition; a first plurality of conductors individually coupled to individual ones of said signal-input means and a second plurality of conductors individually coupled to individual ones of said signal-output means; a plurality of switching elements which are individually coupled by said conductors between individual ones of said signal-input means and individual ones of said signal-output means; means for impressing selectable patterns of control effects on said switching elements for selectively placing predetermined ones of said devices in a different signal-translating condition to form a single operatively connected signal-translating circuit for modifying signal translation between said signal-input and signal-output means, whereby said system performs selected signal-translating operations; one of said devices constituting a spare for use in the event of failure of said at least one operatively connected circuit or the device therein; means for sensing said failure and deriving a control signal therefrom; and means for applying said signal to said impressing means for effecting circuit rearrangement to include said spare in a replacement circuit for the operatively connected circuit which failed.

18. An electrical signal-translating system for use in data processing apparatus comprising: a plurality of signal-translating amplifiers including signal-input means, signal-output means, and means normally maintaining said devices in a nonsignal-translating condition; a first plurality of conductors individually coupled to individual ones of said signal-input means and a second plurality of conductors individually coupled to individual ones of said signal-output means; a plurality of switching elements which are individually coupled by said conductors between individual ones of said signal-input means and individual ones of said signal-output means; means for impressing selectable patterns of control effects on said switching elements for selectively placing predetermined ones of said amplifiers in a signal-translating condition to form operatively connected signal-translating circuits for modifying signal translation between said signal-input and signal-output means, whereby said system performs selected signal-translating operations; one of said devices constituting a spare for use in the event of the failure of an operatively connected circuit or the amplifier therein; means for sensing said failure and deriving a control signal therefrom; and means for applying said signal to said impressing means for effecting circuit rearrangement to include said spare in a replacement circuit for the operatively connected circuit which failed.

19. A self-repairing electrical signal-translating system for use in data processing apparatus comprising: a plurality of transistor signal-translating devices including signal-input means, signal-output means, and means normally maintaining said devices in a nonsignal-translating condition; a first plurality of conductors individually coupled to individual ones of said signal-input means and a second plurality of conductors individually coupled to individual ones of said signal-output means; a plurality of light-responsive variable-resistance switching elements which are individually coupled by said conductors between individual ones of said signal-input means and individual ones of said signal-output means; means for impressing selectable patterns of light on said switching elements for selectively reducing the resistance of said devices to form operatively connected signal-translating circuits for modifying signal translation between said signal-input and signal-output means, whereby said system performs selected signal-translating operations; one of said devices constituting a spare for use in the event of the failure of an operatively connected circuit or the device therein; means for sensing said failure and deriving a control signal therefrom; and means for applying said signal to said light impressing means for effecting circuit rearrangement to include said spare in a replacement circuit for the operatively connected circuit which failed.

References Cited in the file of this patent

UNITED STATES PATENTS

| | | |
|---|---|---|
| 2,229,108 | Maggio | Jan. 21, 1941 |
| 2,624,786 | Potter | Jan. 6, 1953 |
| 2,682,043 | Fitch | June 22, 1954 |
| 2,699,495 | Magnuski | Jan. 11, 1955 |
| 3,016,517 | Saltzberg | Jan. 9, 1962 |
| 3,092,729 | Cray | June 4, 1963 |

UNITED STATES PATENT OFFICE
CERTIFICATE OF CORRECTION

Patent No. 3,152,320            October 6, 1964

Robert J. Domenico et al.

It is hereby certified that error appears in the above numbered patent requiring correction and that the said Letters Patent should read as corrected below.

Column 3, line 67, for "$\bar{A}+\bar{C}+\bar{B}$" read -- $\bar{A}+\bar{B}+\bar{C}$ --; column 5, line 5, for "differential" read -- different --; column 8, lines 48, 52, and 70, and column 9, lines 12, 26, and 39, for "49", each occurrence, read -- 27 --; column 10, line 33, for "on" read -- to --; line 50, for "magnestic" read -- magnetic --.

Signed and sealed this 9th day of February 1965.

(SEAL)
Attest:

ERNEST W. SWIDER
Attesting Officer

EDWARD J. BRENNER
Commissioner of Patents